Figure 1:
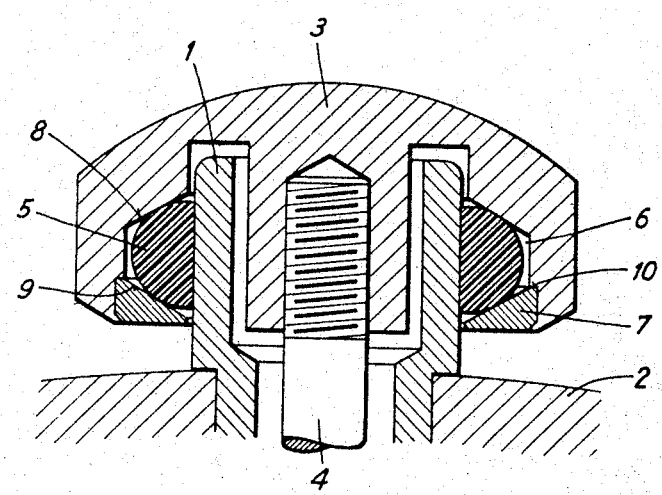

May 30, 1967 R. SOGUEL 3,322,432
WATERTIGHT SEALING MEANS FOR A CONTROL DEVICE
EXTENDING THROUGH THE CASING OF
AN INSTRUMENT
Filed Oct. 29, 1963

Inventor
Rene Soguel
By Stevens, Davis, Miller & Mosher
Attorneys

United States Patent Office 3,322,432
Patented May 30, 1967

3,322,432
WATERTIGHT SEALING MEANS FOR A CONTROL DEVICE EXTENDING THROUGH THE CASING OF AN INSTRUMENT
René Soguel, Rue de la Chapelle 10, Les Hauts-Geneveys, Switzerland
Filed Oct. 29, 1963, Ser. No. 319,793
5 Claims. (Cl. 277—171)

This invention relates to watertight sealing means for a control device extending through the casing of an instrument, for example, to watertight means for sealing the passage of the winding and hand setting stem in a watch.

With most of the watertight watches known in the art, sealing of the stem passage is ensured by an annular gasket made of a rubber-like material and located in an annular cavity of the crown fixed to the stem and permitting the latter to be actuated through the crown being gripped by a person's fingers. In known constructions wherein the sealing gasket is the sole member fitted within the crown cavity, its cross-section usually conforms to that of the crown cavity portion which is defined between the crown walls and the walls of a tube which is fixed to the watchcase and which extends into said crown cavity, this cross-section usually being rectangular. The gasket is pressingly retained within said cavity in a manner whereby it presses against said tube, by means of a washer which is fixedly fitted onto said crown. Since the washer normally presses against said gasket in an axial direction, in order to obtain a sufficient radial pressing force of the gasket against said tube it is necessary that the axial pressing force of the washer be relatively high.

These known constructions have, consequently, several drawbacks. The sealing gasket, which is fixed relative to the crown, is worn away through rotation of the latter around the watchcase tube and the elasticity of the gasket cannot prevent this wear because the gasket is compressed too tightly within the crown. Moreover, a gasket compressed in that manner offers a high resistance to the operation of the crown, so that the latter must have a large enough diameter to permit it to be easily turned by a person's fingers.

In other known constructions the sealing gasket is provided with a circular cross section and it is consequently not squashed within the crown cavity. The watches which comprise such gaskets, have, however, several drawbacks. The molds used in the manufacture of the gaskets having a circular cross section cannot be made so precisely that burrs—in particular along the smallest inner diameter of the gaskets—will be avoided. Since a burr at the place of the gasket which comes into contact with the watchcase tube, and which should therefore seal the passage between the stem and the watchcase, is intolerable, said gaskets must be submitted to a further machining operation after molding in order to remove the undesirable burrs, thus substantially increasing the price of the gasket. Moreover, a gasket with a circular cross section does not safely seal the passage of the winding and hand setting stem. If particles, such as dust, are accumulated around the watchcase tube, the sealing gasket rolls over these impurities when the stem is moved in axial direction, so that said impurities progressively enter the watchcase inner space which should be tightly sealed by said gasket.

It is therefore an object of this invention to provide a watch, in which sealing the passage of the winding and hand setting stem is durably ensured in a safe manner by means which do not alter the working conditions of the stem.

Another object of the invention resides in the fact that sealing said passage is ensured by means of an annular watertight gasket located between two rigid elements, the one forming part of the control device comprising the winding and hand setting stem, and the other one forming part of the watchcase, i.e. the casing instrument, thus excluding any further member which would be independent of these two rigid elements.

Still another object of the invention resides in the shape of the gasket cross section, which comprises a cylindrical surface encompassing one of the two elements between which the gasket is inserted, this gasket thereby producing around said one element a friction great enough to prevent the gasket from rotating around said element, the other element engaging the gasket in such a manner as to exert pressing forces thereon having inwardly directed radial components which increase the gasket pressure on said first element.

A further object of the invention resides in the fact that the gasket can operate like a universal joint and accordingly compensate for the errors of alignment between the winding and hand setting stem, the crown fixed thereto and the watchcase tube, which are due to manufacturing tolerances.

Still further objects of the invention will become apparent in the course of the following description.

Two embodiments of the sealing means improved according to the invention, are represented diagrammatically and by way of example in the accompanying drawings.

Figure 2:
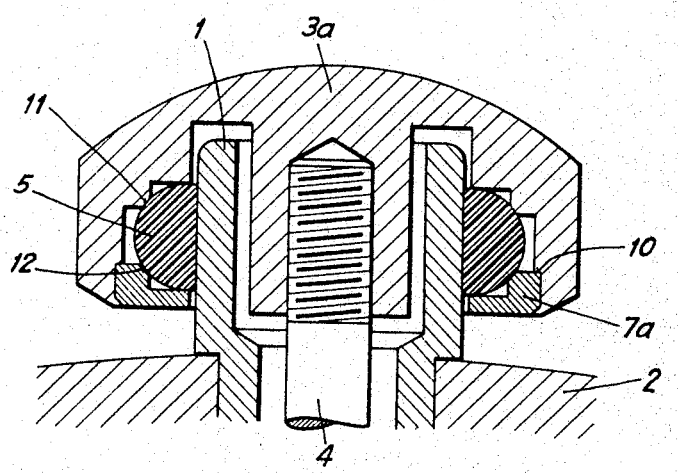

In the drawings:

FIGS. 1 and 2 each shows one of said embodiments in axial section, the only parts which are necessary for the comprehension of the invention being represented.

In the first embodiment, sealing of the passage between a tube 1 fixed to a watchcase 2 and a crown 3 fixed to a winding and hand setting stem 4 is ensured by a watertight gasket 5 compelled to remain in a cavity 6 of crown 3 by a washer 7 fixed to the latter by a setting. The annular gasket 5 has a cross section a little greater than half a circle, so that it has obtuse angles at the two edges of its cylindrical surface encompassing tube 1, thus facilitating setting crown 3 onto tube 1, when the watch is assembled. Gasket 5 is engaged along the circular portion of its cross section by two truncated conical abutment surfaces 8, 9. Surface 8 constitutes the bottom of cavity 6 and surface 9 is situated on washer 7. A shoulder 10 of crown 3 serves as abutment for washer 7 and prevents gasket 5 from being squashed in the crown cavity when washer 7 is set in place. Shoulder 10 ensures that gasket 5 will be pressed axially only to a limited extent within cavity 6. The surfaces 8 and 9 engaging gasket 5 are positioned in such a manner that the gasket is submitted to pressing forces having inwardly directed radial components which increase the radial pressure of gasket 5 on tube 1 and improve the tight closure of the inner space of casing 2 even if the external pressure is substantially higher than the pressure internally of the casing.

When crown 3 is rotated, surfaces 8 and 9 slide along gasket 5 since the friction of the latter around tube 1 is substantially higher than the friction between the gasket 5 and the surfaces 8 and 9. Although the outer surface of gasket 5 is not a spherical surface, it nevertheless permits crown 3 to tilt to some extent, in particular if the crown rotates around an axis which is disposed at an angle with that of tube 1, because of an alignment error of stem 4 in tube 1. The tilting possibility of crown 3 and the relatively slight friction between this crown and gasket 5 provide the advantage that the crown can be rotated relatively easily. The outer diameter of the crown, therefore, need not be increased for the purpose of permitting easy actuation thereof.

Since the annular cavity 6 of crown 3 has not a rectangular, but a trapezoidal cross section, the radius of curvature of the upper bulged surface of the crown can be made greater than with crowns having a rectangular cavity and the same surface of engagement between the gasket and the tube, thus permitting the crown to be given a flatter appearance than with usual crowns.

The manufacture of the different parts shown in FIG. 1 is not more difficult than that of the corresponding parts of the known watches. On the contrary, as regards crown 3, it can be lathe-turned exactly in the same conditions as a known crown provided with a rectangular annular cavity. Washers 7 can likewise be lathe-turned without difficulty. As regards gasket 5 it can be molded by means of tools similar to those used in the manufacture of gaskets having a circular cross section with the only difference that the tool to be used here has to comprise a cylindrical member arranged in the gasket axis to form the inner cylindrical surface thereof. With respect to the gaskets having a circular cross section, the gasket disclosed has the advantage that it must not be subjected to further machining operations after molding.

An important feature of the invention resides in the fact that pressing forces with radial components are exerted on the outer gasket surface, thus increasing the gasket pressure on the tube, since the natural pressure of the gasket due to its own elasticity would not always be sufficient in order to ensure the desired seal.

These forces with radial components could also be exerted on the outer gasket surface by means of rounded edges instead of truncated conical surfaces, as shown in the second embodiment, in which the surfaces 8 and 9 have been replaced by edges 11 and 12 of crown 3a and washer 7a, respectively.

In order to utilize as much as possible the inherent elasticity of the gasket, the latter should not be compressed from all sides. It is thus also an important feature of the invention to mount the tightening gasket in such a manner that the two elements between which it is set, do not engage the same along contiguous portions of the gasket outer surface, the remaining portions of the surface thereof being able to adapt their shapes freely to that of the crown cavity and to compensate in that way for the numerous tolerances. For example, as is evident in FIGURES 1 and 2, the gasket 5 is free to expand into the clearance space which is provided in cavity 6 between the arcuate surface of gasket 5 and the inner wall of crown 3 which extends between abutment surfaces 8 and 9 or 11 and 12. In addition, the gasket is also free to expand in respective clearance spaces provided between the surface of tube 1 and adjacent surfaces on crown 3. In FIGURES 1 and 2, therefore, it is seen that gasket 5 can expand downwardly along tube 1 into a clearance provided between tube 1 and ring 7 or 7a, and also it can expand upwardly along tube 1 in a corresponding clearance space provided between the outer wall of tube 1 and the adjacent portion (in FIGURE 1 this is the inner edge of surface 8) of crown 3.

The sealing means disclosed can obviously also be used with every instrument enclosed in a casing and which must be controlled from outside the casing by means of a device passing through this casing. It will also be observed that the inner element, which is surrounded by the gasket, could just as well form part of the control device and the outer element engaging gasket form part of the instrument casing.

Still further changes in the sizes, shape and arrangement of parts can be resorted to without departing from the spirit of the invention or sacrificing the advantages thereof.

I claim:
1. A sealing means for an instrument control device, for example, for the winding and hand setting stem of a watch, wherein an instrument is enclosed in a casing and a control device therefor is mounted externally of said casing, and wherein said control device is rotatable and axially reciprocable relative to said casing, comprising: a tubular member adapted to be rigidly attached to an instrument casing with said member extending outwardly of said casing, a control member within said tubular member substantially coaxial therewith and having a portion thereof spaced from said tubular member, a first of said members having a straight surface and the other having a surface radially spaced from said first member surface whereby an annular space is defined between said surfaces, an annular watertight sealing gasket fitted within said space having an inner straight side contacting said straight surface and an outer arcuate side facing said surface of said other member, the surface of said other member including spaced abutment portions contacting said gasket on its outer side in substantially point-to-point contact therewith along respective spaced apart lines extending the full circumferential extent of said gasket outer side, said gasket forming respective spaced apart watertight seals along said spaced apart lines relative to the surface of said other member, a clearance space being defined radially between said gasket outer side and said other member surface and axially between said abutment portions, said gasket being tightly pressed between said abutment portions and said surface on said first member, said abutment portions being so positioned relative to the gasket outer side as to exert pressing forces thereagainst in a radial direction relative to the axis of said control member, said gasket being of a resilient material such that under the action of the pressing forces exerted thereon it is deformable, said clearance space providing an opening into which said gasket is free to expand when so deformed, said control member being axially reciprocable relative to said tubular member with the inner side of said gasket being axially slidable along said surface of said first member, and said control member being rotatable relative to said tubular member with said abutment portions sliding circumferentially along the outer side of said gasket.

2. The sealing means of claim 1, said abutment portions being defined by axially spaced surfaces convergingly inclined in an outward direction.

3. The combination of claim 1, said watertight gasket having substantially a semicircular cross section.

4. The sealing means of claim 1, said gasket having a cross-section comprising a portion of a circle slightly larger than a semi-circle, said gasket inner side constituting a chord connecting the opposite ends of said outer arcuate side.

5. The sealing means of claim 1, said abutment portions being comprised of spaced apart rounded edge portions on said outer element, said edge portions convergingly facing towards said tubular member.

References Cited

UNITED STATES PATENTS

| | | | |
|---|---|---|---|
| 2,779,153 | 1/1957 | Soguel | 58—90 |
| 2,912,819 | 11/1959 | Waldman | 58—90 |
| 2,965,308 | 12/1960 | Holdren | 277—115 X |

FOREIGN PATENTS 234,618  2/1945  Switzerland.

SAMUEL ROTHBERG, *Primary Examiner.*